United States Patent [19]

Musk

[11] Patent Number: 5,745,621

[45] Date of Patent: Apr. 28, 1998

[54] OPTICAL CONNECTOR

[75] Inventor: Robert William Musk, Fieldings, England

[73] Assignee: Hewlett-Packard Company, Palo Alto, Calif.

[21] Appl. No.: 724,983

[22] Filed: Oct. 3, 1996

[30] Foreign Application Priority Data

Oct. 16, 1995 [GB] United Kingdom ............... 9521100

[51] Int. Cl.⁶ ..................................................... G02B 6/38
[52] U.S. Cl. ..................... 385/72; 385/53; 385/70; 385/77; 385/78; 385/92
[58] Field of Search ................................ 385/53, 60, 70, 385/72, 76, 77, 78, 88, 92, 139

[56] References Cited

U.S. PATENT DOCUMENTS

| | | | |
|---|---|---|---|
| 4,759,600 | 7/1988 | Caron et al. | 385/72 X |
| 4,802,727 | 2/1989 | Stanley | 385/92 X |
| 4,826,272 | 5/1989 | Pimpinella et al. | 385/53 X |
| 4,995,695 | 2/1991 | Pimpinella et al. | 385/92 X |
| 5,093,878 | 3/1992 | Haley et al. | 385/92 |
| 5,239,605 | 8/1993 | Shimada | 385/88 |
| 5,384,885 | 1/1995 | Diner | 385/140 |
| 5,522,001 | 5/1996 | Meadowcroft | 385/88 |
| 5,533,159 | 7/1996 | Okochi et al. | 385/93 |
| 5,586,207 | 12/1996 | Goodwin | 385/92 |
| 5,631,986 | 5/1997 | Frey et al. | 385/78 |
| 5,649,039 | 7/1997 | Benzoni et al. | 385/78 |

FOREIGN PATENT DOCUMENTS

| | | | |
|---|---|---|---|
| 053482A3 | 6/1982 | European Pat. Off. | 385/88 X |
| 0304182A2 | 2/1989 | European Pat. Off. | 385/88 X |
| 0534431A1 | 3/1993 | European Pat. Off. | 385/88 X |
| 3910166A1 | 10/1990 | Germany | 385/33 X |
| 4311980C1 | 6/1994 | Germany | 385/88 X |

OTHER PUBLICATIONS

Euroupean Search Report, RS 95818, dtd 9 May 1996.

*Primary Examiner*—Brian Healy

[57] ABSTRACT

An optical connector is provided for connecting an optical fiber to, for example, a laser. The optical connector comprises a housing defining a passage therethrough and a stop for abutment against a face of a ferrule containing an optical fiber. The stop is positioned and shaped so that in use the area of contact between the stop and the ferrule end face is less than 10% of the total area of the end face of the ferrule, and the area of contact between the stop and the ferrule end face is close to a central axis of the ferrule. Many different designs of angled ferrule are available for reducing the level of optical reflections within optical systems. The present optical connector allows these many different designs of angled ferrules to be accurately aligned to an optical device.

15 Claims, 6 Drawing Sheets

5,745,621

OPTICAL CONNECTOR

BACKGROUND OF THE INVENTION

The present invention relates to an optical connector, and in particular to an optical connector for receiving a ferrule containing an optical fibre.

Optical connectors are used to achieve an optical connection between optical transmission lines, or between an optical transmission line and an optical device. The optical device may be optically active, for example, a laser or a photodiode, or optically passive, for example, a lens. Many optical connectors are designed to receive a ferrule in which is mounted an optical fibre. The ferrule is often circularly cylindrical, and the optical fibre is often mounted on the central axis of the ferrule. The optical connector comprises a housing having a passage, or bore, therethrough for receiving the ferrule. The ferrule must have a precision fit within the bore of the housing in order to ensure accurate lateral alignment between the optical fibre within the bore and the device to which the optical fibre is to be optically connected. The optical communications industry is moving towards a de facto standard ferrule which is circularly cylindrical and has a diameter of 2.5 millimeters. A further requirement for reliable, accurate alignment of the ferrule to a device via an optical connector is some means for controlling the longitudinal position of the ferrule within the connector, and thus the distance of the ferrule from the device. This is often provided by a mechanical stop within the housing of the optical connector which abuts against an end face of the ferrule.

It is desirable to reduce the reflections between the end face of a fibre and other components within an optical system. For example, reflections between the end face of an optical fibre and a laser can result in undesirable optical oscillations within the laser, which lead to unstable operation of the laser. Reflections between an optical fibre end face and a photodiode can cause excess noise within an optical communication system. The effect of these reflections can be reduced by angling the end face of the fibre with respect to the central axis of the fibre. This angling is usually achieved by, for example, polishing the whole, or a substantial part, of the end face of the ferrule in which the fibre is mounted, at an angle to the central axis of the ferrule. There is no accepted standard for the configuration of an angled ferrule. Angles in common use vary from about 6 degrees to about 15 degrees (measured between the normal to the ferrule end face and the central axis of the ferrule). The end faces of commonly available ferrules are also not flat, but are often curved with a radius of curvature which may be from about 10 millimeters to about 25 millimeters. Furthermore, often the angled end face of a ferrule is formed at the end of a reduced diameter pedestal, which extends from the main body of the ferrule.

The diameter of such pedestals commonly can be between about 0.8 millimeters and about 1.7 millimeters. The many different designs of angled ferrule do not affect the lateral alignment of the optical fibre to a device, but, when employed in known optical connectors, do lead to longitudinal alignment errors between the fibre and the device. If an optical fibre end face is not accurately positioned at the desired distance from a device, the performance of the optical system may be seriously deteriorated. For example, if the optical device is a laser, the amount of optical power coupled to the optical fibre will be reduced.

SUMMARY OF THE INVENTION

It is an aim of the present invention to provide an improved optical connector which, to some extent, addresses the deficiencies of known optical connectors. More specifically, it is an aim of the present invention to provide an optical connector which can accurately longitudinally align angled ferrules of different designs to an optical device.

According to the present invention, there is provided an optical connector for receiving a ferrule containing an optical fibre, the optical connector comprising:

a housing defining a passage therethrough and, a stop for abutment against a face of the ferrule, characterised in that the stop is positioned and shaped so that in use the area of contact between the stop and the ferrule end face is less than 10% of the total area of the end face of the ferrule, and in that the area of contact between the stop and the ferrule end face is close to a central axis of the ferrule.

Thus, by providing an optical connector with a stop which contacts only a small proportion of the end face of the ferrule, at a position close to the central axis, angled ferrules of many different designs are brought to rest within the connector at substantially the same longitudinal position.

BRIEF DESCRIPTION OF THE DRAWINGS

The present invention is now described in further detail, by way of example only, and with reference to the accompanying drawings, in which.

DETAILED DESCRIPTION OF THE INVENTION

Figure 1:
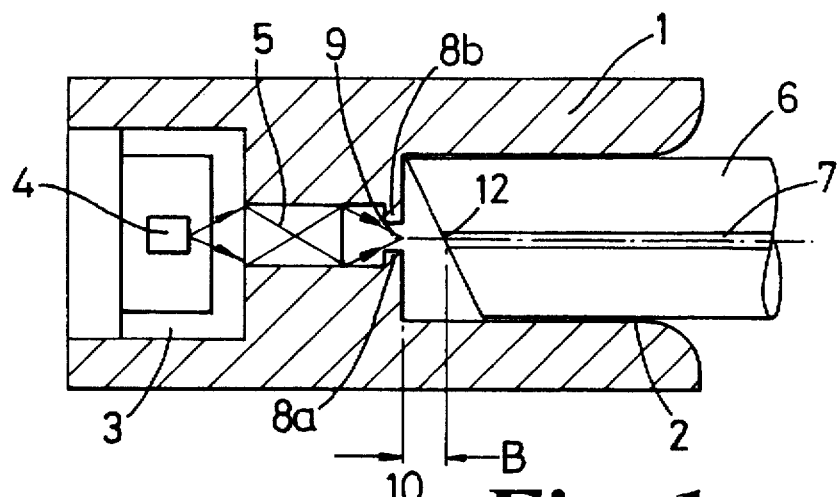
FIG. 1 is a cross-section through a prior art optical connector, into which has been inserted an angled ferrule.

FIG. 1 shows a prior art optical connector having a housing 1 defining a passage, or bore 2. Within a cavity 3 of the connector housing 1 is mounted a semi-conductor laser device 4 and a lens 5. FIG. 1 also shows a ferrule 6 having an optical fibre 7 mounted on its central axis. Longitudinal movement of the ferrule 6 within the bore 2 of the optical connector housing 1 is limited by the abutment of the ferrule 6 against a mechanical stop 8 provided within the housing 1. The mechanical stop 8 is in the form of, what is known in the art as, a "web" which extends across the bore 2 of the housing 1. The web 8 has a central orifice 9 for allowing the passage of optical radiation between the laser 4 and the optical fibre 7 of the ferrule 6 via the lens 5. Thus, in cross-section, the web 8 is seen to comprise two components 8a and 8b extending from either side of the bore 2. When assembling such an optical connector the laser 4 and lens 5 are very carefully positioned so as to ensure that optical radiation from the laser 4 is brought to a focal point close to an optical datum point 10 at the web 8. Often the alignment of the laser 4 to the optical fibre 7 is carried out "actively" i.e. the laser 4 is activated so as to emit optical radiation and the power level of such radiation coupled to the optical fibre is monitored. The alignment between the laser 4 and the optical fibre 7 is then adjusted so as to maximise the optical power within the optical fibre. At this point the position of the laser 4 is fixed relative to the optical connector housing 1.

Figure 2:
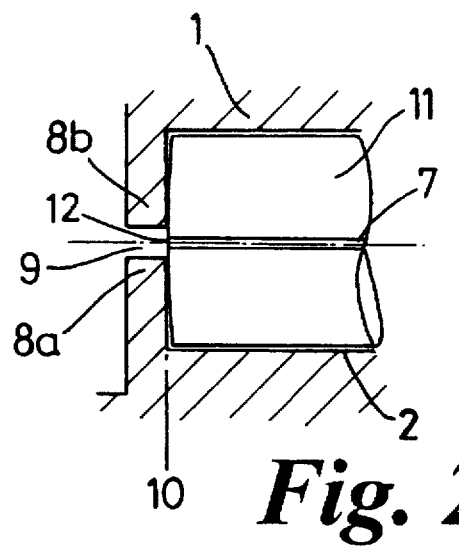
FIG. 2 is an enlarged part cross-section of the optical connector of FIG. 1, into which has been inserted a non-angled ferrule.

With reference to FIG. 2, which shows an enlarged portion, in cross-section, of the optical connector of FIG. 1, it can be seen that when a non-angled ferrule 11 is positioned within the bore 2 of the housing 1, the end face 12 of the optical fibre 7 is positioned at the optical datum point 10. This ensures that the optical coupling between the laser 4 and the optical fibre 7 is maximised. However, referring back to FIG. 1, when an angled ferrule 6 is inserted into the same optical fibre connector it can be seen that the end face 12 of the optical fibre 7 is positioned at a distance "B" from the optical datum point 10. Clearly, if the end face 12 of the optical fibre 7 is not held at the optical datum position 10, coupling between the laser 4 and the optical fibre 7 will be less than optimum. Furthermore, although the value of "B" could be taken into account, and compensated for, when aligning the laser 4, if an angled ferrule 6 of a different design is utilised the value of "B" will be significantly different.

Figure 3:
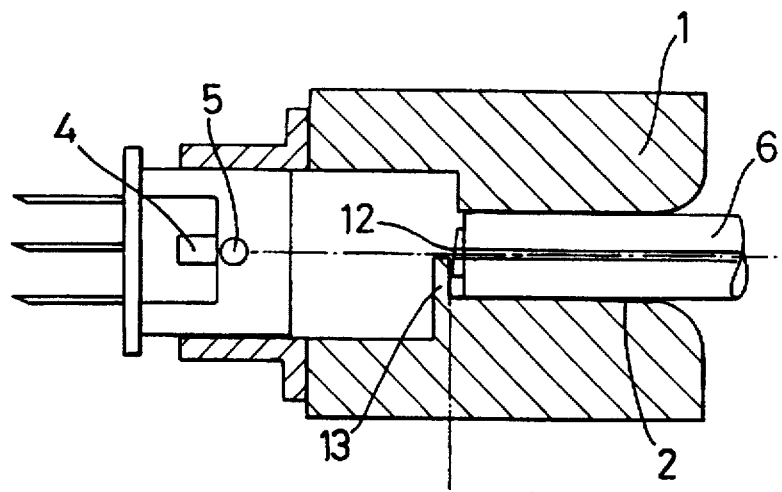
FIG. 3 is a cross-section of an optical connector according to the present invention, into which has been inserted an angled ferrule.
Figure 4:
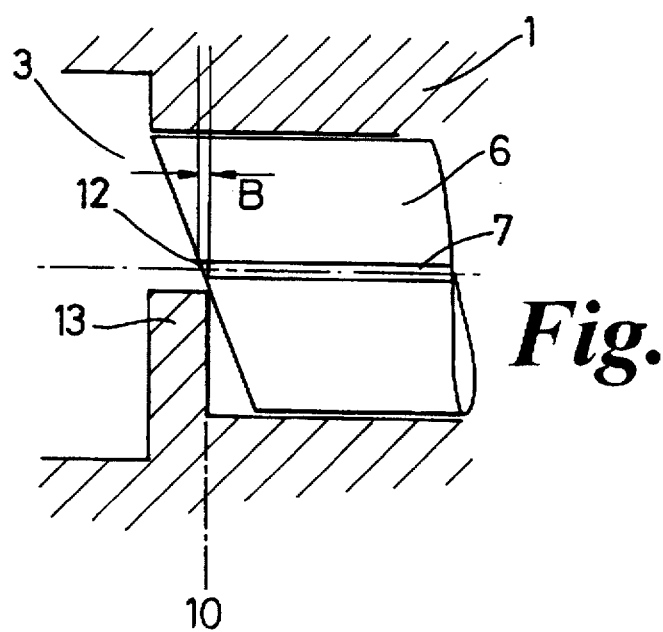
FIG. 4 is an expanded part cross-section of the optical connector of FIG. 3, FIG. 5 a, b and c show examples of different designs of angled ferrule.

FIG. 3 shows an optical connector according to the present invention. The housing 1 of the optical connector comprises a bore 2 and a stop 13 as for prior art connectors. However, this stop 13 is positioned and shaped so as to contact the end face of the ferrule over a small area, close to the central axis of the ferrule. With reference to FIG. 4, which shows an expanded cross-sectional view of a connector according to the present invention, it can be seen that the end face 12 of the fibre 7 is very close to the optical datum point 10. For connectors according to the present invention the distance "B" between the end face 12 of the optical fibre 7 and the optical datum point 10 is in the opposite direction to that for conventional optical connectors.

Figure 5A:
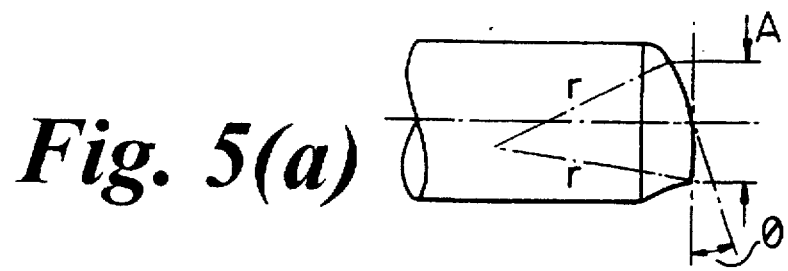
Figure 5B:
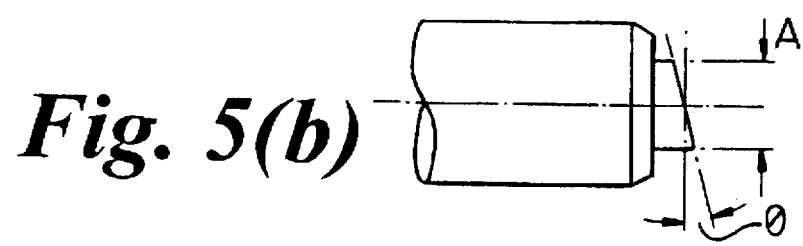
Figure 5C:
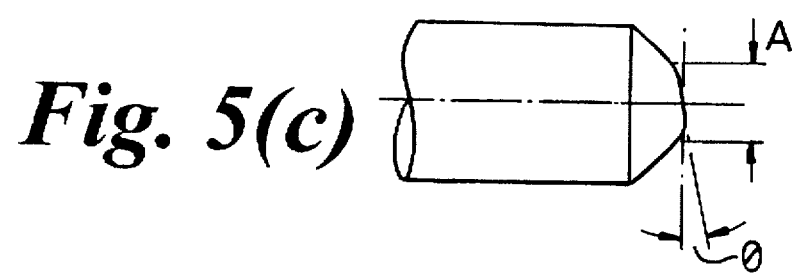

FIGS. 5 a, b and c show three examples of presently available angled ferrules. The pedestal diameter A for different ferrule designs is known to vary from approximately 0.8 millimeters to approximately 1.7 millimeters. The angle θ of the endface to the central axis of the ferrule can, for differing designs, have a value of between approximately 6 degrees and approximately 15 degrees. The radius of curvature (r) of the end face of the ferrule, for different ferrule designs, can be between 10 and 25 millimeters. There are thus a considerable number of factors which can affect the position of the end face 12 of an optical fibre 7 within an angled ferrule relative to the optical datum point 10 within an optical connector. Table 1 quantitatively illustrates the variation in the distance from the optical datum "B" which can be experienced when different designs of angled ferrule are utilised within the same prior art connector.

TABLE 1

PRIOR ART CONNECTOR

| Web Stop diameter (mm) | Pedestal diameter (mm) | end face angle (degrees) | end face radius (mm) | Distance "B" from optical datum (μm) |
|---|---|---|---|---|
| 0.5 | 0.8 | 8 | 10 | 48 |
| 0.5 | 0.8 | 8 | 25 | 53 |
| 0.5 | 1.7 | 8 | 10 | 83 |
| 0.5 | 1.7 | 8 | 25 | 105 |
| 0.5 | 0.8 | 12 | 10 | 77 |
| 0.5 | 0.8 | 12 | 25 | 81 |
| 0.5 | 1.7 | 12 | 10 | 144 |
| 0.5 | 1.7 | 12 | 25 | 166 |
| 0.5 | 0.8 | 15 | 10 | 99 |
| 0.5 | 0.8 | 15 | 25 | 104 |
| 0.5 | 1.7 | 15 | 10 | 192 |
| 0.5 | 1.7 | 15 | 25 | 213 |

From Table 1 it can be seen that the value of "B" varies greatly with pedestal diameter, end face angle and end face radius. Table 2 shows equivalent calculations made for three different designs of optical connector according to the present invention. A parameter, termed the effective web diameter, has been utilised so that comparison with conventional optical connectors is facilitated. An optical connector according to the present invention having an effective web diameter of 0.5 millimeters is equivalent to a prior art optical connector having a web diameter of 0.5 millimeters, in which one half 8b of the web has been removed.

TABLE 2

CONNECTOR ACCORDING TO PRESENT INVENTION

| Effective web diameter (mm) | Pedestal diameter (mm) | End face radius (mm) | Distance "B" from optical axis (μm) | | |
|---|---|---|---|---|---|
| | | | 8° | 12° | 15° |
| 0.25 | 0.8 | 10 | −18 | −27 | −34 |
| 0.25 | 0.8 | 25 | −17 | −27 | −33 |
| 0.25 | 1.7 | 10 | −18 | −27 | −34 |
| 0.25 | 1.7 | 25 | −17 | −27 | −33 |
| 0.50 | 0.8 | 10 | −35 | −53 | −68 |
| 0.50 | 0.8 | 25 | −35 | −53 | −67 |
| 0.50 | 1.7 | 10 | −35 | −53 | −68 |
| 0.50 | 1.7 | 25 | −35 | −53 | −67 |
| 0.75 | 0.8 | 10 | −53 | −80 | −101 |
| 0.75 | 0.8 | 25 | −53 | −80 | −100 |
| 0.75 | 1.7 | 10 | −53 | −80 | −101 |
| 0.75 | 1.7 | 25 | −53 | −80 | −100 |

From Table 2 it can be seen that ferrules having different pedestal diameters have absolutely no effect on the value of the distance "B". Ferrules of different end face radius have very slightly different values of "B" (by less than one micron). While ferrules having different end face angles have somewhat different values for "B", the absolute variation in the value of "B" is far smaller than for conventional optical connectors. For example, for an effective web diameter of 0.5 millimeters the variation in "B" between a ferrule having an 8 degree end face angle and one having a 15 degree end face angle is a maximum of 33 microns. If the same two angled ferrules are placed within a conventional optical connector the maximum variation in "B" could be up to 165 microns.

Figure 6:
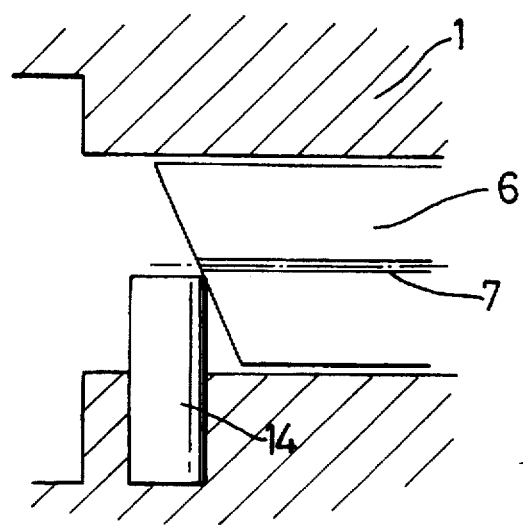
FIG. 6 is a part cross-section through an optical connector according to a first embodiment of the present invention.

As will be appreciated by those skilled in the art, the stop 13 of the present invention can be realised in a number of ways. FIG. 6 shows a first embodiment of the present invention in which the stop 13 is implemented via a pin 14 inserted into the side wall of the housing 1 of the optical connector.

Figure 7:
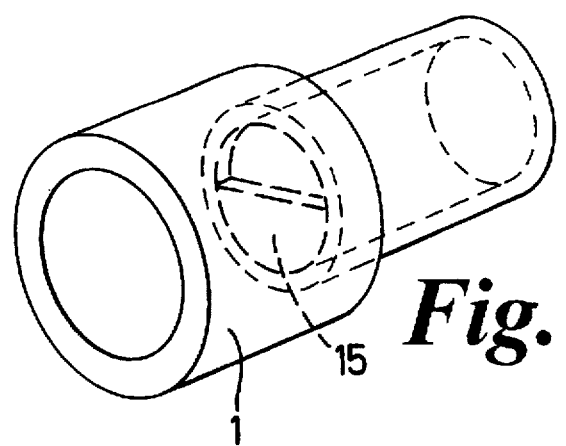
FIG. 7 shows a schematic, perspective view of an optical connector according to a second embodiment of the present invention.

In a second embodiment of the present invention, shown in FIG. 7, the stop 13 has been implemented as an integral part of the housing 1. The housing 1 is moulded from plastics materials with an integral, semi-circular stop 15.

Figure 8A:
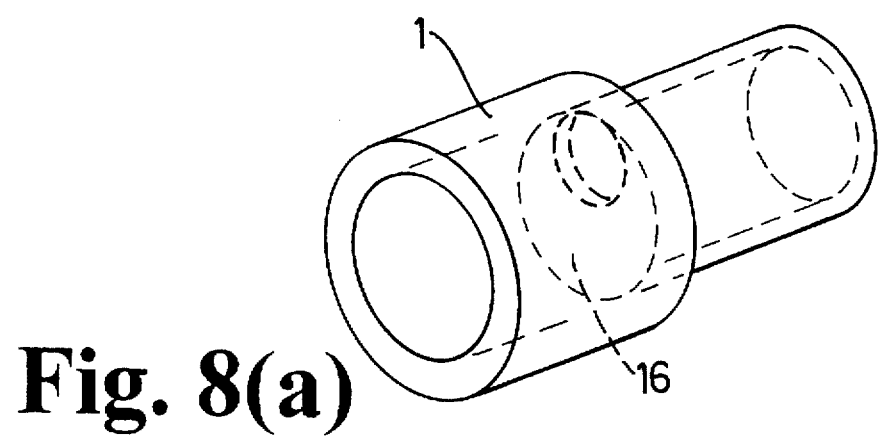
FIG. 8 shows an optical connector according to a third embodiment of the present invention, in FIG. 8a in a schematic, perspective view, in FIG. 8b in an intermediate stage of manufacture, both in end elevation, and in longitudinal cross-section, and in 8c after completion of manufacture, in end elevation and in longitudinal cross-section.
Figure 8B:
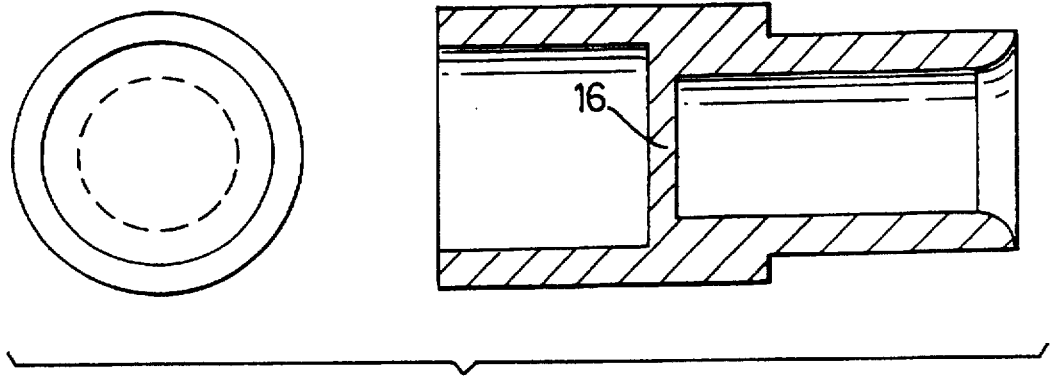
Figure 8C:
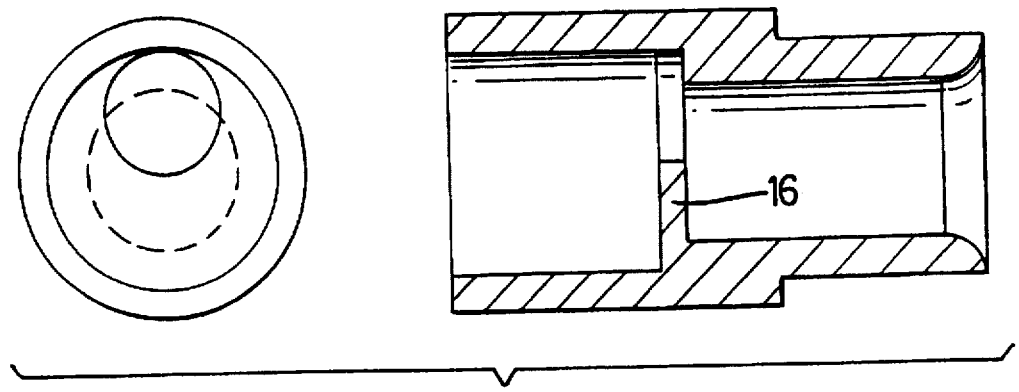

In a third embodiment of the present invention, shown in FIG. 8, the housing 1 is first formed with a web, or stop, which extends across the whole of the bore 2 of the housing (see FIG. 8b). The stop 16 is then formed by drilling a hole, which is not centred on the central axis of the ferrule, through the web. This results in a crescent shaped stop as shown in FIG. 8c.

It will be appreciated by those skilled in the art of connectors, that a housing according to the present invention may be configured so as to be compatible with any standard optical connector, for example, ST, SC, FC, or DIN 47256.

I claim:

1. An optical connector for receiving a ferrule containing an optical fibre, the optical connector comprising:

a housing defining a passage therethrough, and a stop for abutment against a face of the ferrule, characterised in that the stop is positioned and shaped so that in use the area of contact between the stop and the ferrule end face is less than 10% of the total area of the end face of the ferrule, and in that the area of contact between the stop and the ferrule end face is close to a central axis of the ferrule.

2. An optical connector as claimed in claim 1, wherein the area of contact between the stop and the ferrule is less than 5% of the total area of the end face of the ferrule.

3. An optical connector as claimed in claim 1, wherein the area of contact between the stop and the ferrule is less than 1% of the total area of the end face of the ferrule.

4. An optical connector as claimed in claim 1, wherein the area of contact between the stop and the ferrule is less than 0.1% of the total area of the end face of the ferrule.

5. An optical connector as claimed in claim 1, wherein the area of contact between the stop and the ferrule is less than 0.01% of the total area of the end face of the ferrule.

6. An optical connector as claimed in claim 1, wherein the distance from the area of contact to the central axis is less than 20% of a diameter of the ferrule.

7. An optical connector as claimed in claim 1, wherein the distance from the area of contact to the central axis is less than 10% of a diameter of the ferrule.

8. An optical connector as claimed in claim 1, wherein the distance from the area of contact to the central axis is less than 5% of a diameter of the ferrule.

9. An optical connector as claimed in claim 1, wherein the distance from the area of contact to the central axis is less than 1% of a diameter of the ferrule.

10. An optical connector as claimed in claim 1, wherein the stop obscures less than one half of the passage in the housing.

11. An optical connector as claimed in claim 1, wherein the stop is semi-circular in cross-section.

12. An optical connector as claimed in claim 1, wherein the stop is crescent shaped in cross-section.

13. An optical connector as claimed in claim 1, wherein the stop comprises a pin extending from a wall of the housing into the passage.

14. An optical connector as claimed in claim 1, wherein the area of contact is substantially a line contact.

15. An optical connector as claimed in claim 1, wherein the area of contact is substantially a point contact.

* * * * *